United States Patent
Li

(10) Patent No.: US 12,159,147 B2
(45) Date of Patent: Dec. 3, 2024

(54) PROGRAM STARTUP METHOD, ELECTRONIC SYSTEM, AND NON-TRANSITORY STORAGE MEDIUM

(71) Applicant: AutoChips Inc., Hefei (CN)

(72) Inventor: Zhengpeng Li, Hefei (CN)

(73) Assignee: AutoChips Inc., Hefei (CN)

( * ) Notice: Subject to any disclaimer, the term of this patent is extended or adjusted under 35 U.S.C. 154(b) by 112 days.

(21) Appl. No.: 17/829,247

(22) Filed: May 31, 2022

(65) Prior Publication Data

US 2022/0382563 A1 Dec. 1, 2022

(30) Foreign Application Priority Data

May 31, 2021 (CN) .......................... 202110603413.9

(51) Int. Cl.
*G06F 9/445* (2018.01)
(52) U.S. Cl.
CPC ................................. *G06F 9/44557* (2013.01)
(58) Field of Classification Search
CPC ............. G06F 9/44557; G06F 12/1416; G06F 2212/205
See application file for complete search history.

(56) References Cited

U.S. PATENT DOCUMENTS

| | | | | |
|---|---|---|---|---|
| 6,546,517 B1 * | 4/2003 | Yoshimura | ........... | G11C 16/105 714/763 |
| 2005/0055515 A1 * | 3/2005 | Greicar | ............... | G06F 9/44557 711/154 |
| 2007/0094656 A1 * | 4/2007 | Talati | ..................... | G06F 8/656 717/168 |
| 2016/0070914 A1 * | 3/2016 | Baentsch | .............. | G06F 21/575 713/2 |
| 2017/0344260 A1 * | 11/2017 | Lee | ........................ | G06F 3/0688 |
| 2020/0117804 A1 * | 4/2020 | Laffey | .................... | H04L 9/0877 |

FOREIGN PATENT DOCUMENTS

| | | |
|---|---|---|
| CN | 111538540 A | 8/2020 |
| CN | 107832021 B | 9/2020 |
| JP | 2007065753 A | 3/2007 |
| JP | 2013222372 A | 10/2013 |
| WO | WO-2022057872 A1 * | 3/2022 |

OTHER PUBLICATIONS

Japanese Notice of Reasons for Refusal, Japanese Patent Application No. 2022-060054, mailed May 25, 2023 (6 pages).

\* cited by examiner

*Primary Examiner* — Hyun Soo Kim

(57) ABSTRACT

A program startup method, an electronic system, and a non-transitory storage medium are disclosed in the embodiments of the present disclosure. The method includes detecting a startup requirement for a program, startup codes of the program being at least partially stored in an external memory, and a part of the startup codes stored in the external memory comprising a plurality of code segments; and performing an operation of loading one of the code segments of the external memory to a RAM and running the one of the code segments multiple times. The one of the code segments loaded each time is different with each other. A size of each code segment is less than or equal to a size of an area of the RAM capable of executing each code segment.

16 Claims, 2 Drawing Sheets

PROGRAM STARTUP METHOD, ELECTRONIC SYSTEM, AND NON-TRANSITORY STORAGE MEDIUM

CROSS REFERENCE TO RELATED APPLICATIONS

The present application is based on the China Patent Application No. 202110603413.9, filed on May 31, 2021, and claims priority of this China patent application, the entire content of the Chinese patent application is incorporated herein by reference in its entirety.

TECHNICAL FIELD

The present disclosure relates to the technical field of computers, in particular to a program startup method, an electronic system, and a non-transitory storage medium.

BACKGROUND

Generally, various programs of devices are started in memories of the devices. For example, in an embedded device, generally a Static Random-Access Memory (SRAM) may be configured to start the programs. However, in solutions in the related art, all codes required for a startup of the program are directly loaded from an external memory to a RAM at one time, which is more suitable for a case of a small program. Once a program required to be started is relatively large, the solutions in the related art may result in an over slow program startup speed, such that a response speed of the program may be over slow.

SUMMARY OF THE DISCLOSURE

At least a program startup method, a device, and a non-transitory storage medium are provided by the present disclosure.

According to a first aspect of the present disclosure, the program startup method is provided and includes detecting a startup requirement for a program, wherein startup codes of the program are at least partially stored in an external memory, and a part of the startup codes stored in the external memory comprises a plurality of code segments; and performing an operation of loading one of the code segments of the external memory to a RAM and running the one of the code segments multiple times. The one of the code segments loaded each time is different with each other. A size of each code segment is less than or equal to a size of an area of the RAM capable of executing the each code segment.

According to a second aspect of the present disclosure, a program startup device is provided and includes a requirement detecting module and a startup executing module. The requirement detecting module is configured to detect a startup requirement for a program. Startup codes of the program are at least partially stored in an external memory, and a part of the startup codes stored in the external memory includes a plurality of code segments. The startup executing module is configured to perform an operation of loading one of the code segments of the external memory to a RAM and running the one of the code segments multiple times. The one of the code segments loaded each time is different with each other. A size of each code segment is less than or equal to a size of an area of the RAM capable of executing the each code segment.

According to a third aspect of the present disclosure, an electronic device is provided and includes a RAM and a processor. The processor is configured to execute program instructions stored in the RAM to perform the program startup method described above.

According to a fourth aspect of the present disclosure, a non-transitory computer-readable storage medium is provided, and configured to store program instructions. When the program instructions are executed by a processor, the processor is caused to perform the program startup method described above.

According to the above solutions, by the startup codes segmented and stored in the external memory are loaded to the RAM and executed, such that the startup codes are not required to be all loaded to the RAM at one time, such that a program startup efficiency may be improved. For example, in a case of the program being relatively large, when the program is started, in response to all of the startup codes required for the program startup being required to be loaded at one time, the startup speed may thus be slow, that is, the program response speed may be slow.

It should be understood that, general descriptions above and subsequent detail descriptions are only exemplary and explanatory, and are not limitations to the present disclosure.

BRIEF DESCRIPTION OF THE DRAWINGS

Accompanying drawings are incorporated to and constitute a part of the specification, illustrate embodiments consistent with the present disclosure, and are configured to illustrate technical solutions of the present disclosure cooperating with the description.

DETAILED DESCRIPTION

The solutions of the embodiments of the present disclosure will be described in detail in the following with reference to the accompanying drawings.

In the following description, in order to illustrate and not in order to limit, specific details such as specific system structures, interfaces, techniques, and the like, are set forth to thoroughly understand the present disclosure.

A term "and/or" in the description is only an association relationship to describe associated objects, indicates three relationships may exist. For example, A and/or B may represent three cases: A exists alone, A and B exist simultaneously, and B exists alone. In addition, a character "/" in the description may generally indicate that an associated object before "/" and an associated object after "/" are in an "or" relationship. Also, "multiple" or "a plurality" of and the like, may indicate two or more than two. Besides, a term "at least one" in the description may represent any one of the multiple, or any combination of at least two of the multiple.

For example, including at least one of A, B, C may represent any one of or multiple elements chose from a set constitute of A, B and C.

Figure 1:
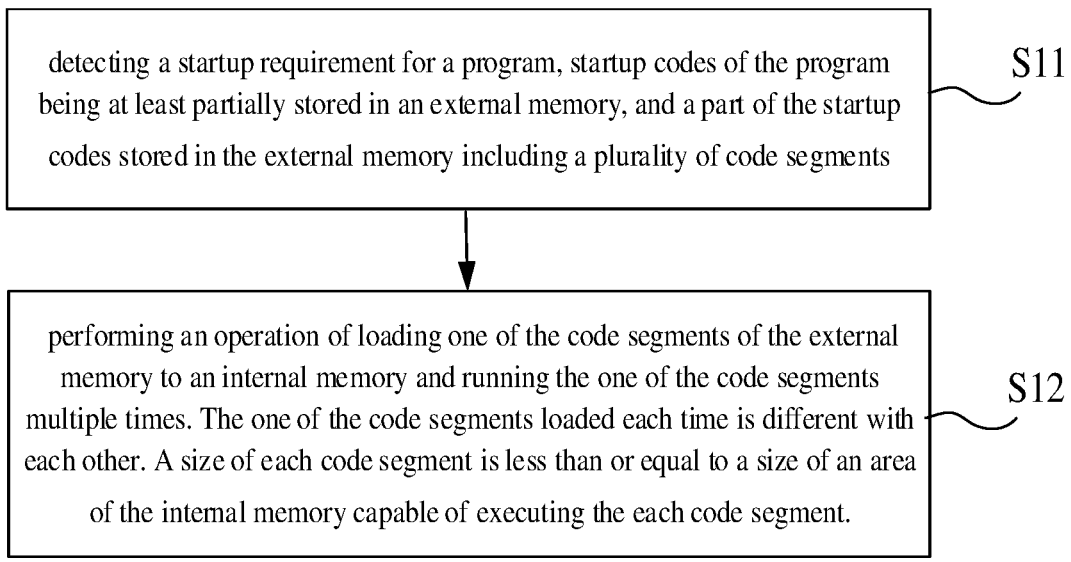
FIG. 1 is a first schematic flow chart of a program startup method according to an embodiment of the present disclosure.

FIG. 1 is a first schematic flow chart of a program startup method according to an embodiment of the present disclosure. Specifically, the method may include the following operations.

An operation S11: detecting a startup requirement for a program. In some embodiments, startup codes of the program are at least partially stored in an external memory, and a part of the startup codes stored in the external memory includes a plurality of code segments.

At least a part of the startup codes may be a part of the startup codes, and may also be all of the startup codes. In some embodiments, a specific proportion of the startup codes being stored in the external memory may be determined based on a size of the program and a size of a RAM.

The method provided by the embodiments of the present disclosure may be applied to a program startup of an embedded device, for example, a microcontroller unit (MCU) or an in-vehicle infotainment (IVI) having requirements on a power consumption and a cost. Of course, the foregoing is only an example, and the method provided by the embodiments of the present disclosure may be applied to any other devices to support a startup of a larger program.

After a startup instruction is received, it is determined that the startup requirement of the program has been detected. The startup codes of the program may be stored in the external memory in segments. In some embodiments, the external memory may be a non-volatile memory (e.g., NOR Flash), a SD card, an eMMC (Embedded Multi Media Card) memory, an online storage, and the like.

S12: performing an operation of loading one of the code segments of the external memory to a RAM and running the one of the code segments multiple times. The one of the code segments loaded each time is different with each other. A size of each code segment is less than or equal to a size of an area of the RAM capable of executing each code segment.

The operation of loading the one of the code segments of the external memory to the RAM and running the one of the code segments multiple times may be configured to load one code segment once, may also be configured to load a plurality of code segments once. Specifically, one code segment may be loaded at one time, and after the one code segment is executed, a next code segment may be loaded, until all the code segments are loaded. In other embodiments, a plurality of code segments may be loaded at one time, and after all or a part of the plurality of loaded code segments are executed, next plurality of code segments are loaded, until all the code segments are loaded. A loading operation in the present embodiment may be a copying operation. The number of code segments loaded from the external memory to the RAM each time substantially depends on a storage space of the RAM. When a space of the RAM may support loading a plurality of code segments at one time, in order to improve an efficiency, the plurality of code segments may be loaded at one time. When the space of the RAM is insufficient, only one single code segment may be loaded at one time.

The size of each code segment is less than or equal to the size of the area of the RAM capable of executing each code segment, such that the RAM may load the code segment normally and a probability of a failure of the program startup due to loading errors may be reduced.

According to the above solution, by loading the startup codes stored in the external memory in segments to the RAM and executing the startup codes, the startup codes are not required to be all loaded to the RAM at one time, such that a program startup efficiency may be improved. For example, in a case of the program being relatively large, when starting the program, in response to all of the startup codes required for the program startup being required to be loaded at one time, a startup speed may be slow, that is, a program response speed may be slow.

In some disclosed embodiments, in a process of performing the operation of loading one of the code segments of the external memory to the RAM and running the one of the code segments multiple times, whether an idle storage space of the RAM is less than a storage space required by a to-be-loaded code segment is determined. In response to the idle storage space of the RAM being less than the storage space required by the to-be-loaded code segment, any one of the following operations may be performed. In a first operation, at least a part of the code segments of the RAM which have been run and/or at least a part of the code segments of the RAM which are not going to be run in a preset period, that is, to-be-removed code segments, is removed from the RAM, to load the to-be-loaded code segment to the RAM. In some embodiments, a meaning of "removed" may be "deleted the to-be-removed code segments from the RAM". Manners of deleting may include covering the to-be-removed code segments with to-be-loaded code segments. In this way, a space may be freed to store the to-be-loaded code segments. In a second operation, at least the part of the code segments of the RAM which have been run and/or at least the part of the code segments of the RAM which are not going to be run in the preset period, to-be-moved code segments, is moved to and stored in the external memory. The preset period may be set based on program startup time. In some embodiments, the part of the to-be-moved code segments being moved to and stored in the external memory may in a manner of covering code segments the same with to-be-moved code segments, or in a manner of not covering any code segment of the external memory but being stored in a corresponding idle storage space directly. The corresponding idle storage space may be a non-generic code area in the external memory or any other areas capable of storing the to-be-moved code segments, which will not be specifically limited herein. In some embodiments, the part of the code segments which has been run may be all of the code segments which have been run or at least a part of the code segments which have been run. In some specific application scenarios, before the code segments are loaded at least one time, when the idle storage space of the RAM is less than the storage space required by the to-be-loaded code segment, at least the part of code segments of the RAM which have been run may be deleted. For example, after performing the operation of loading one of the code segments of the external memory to the RAM and running the one of the code segments once, another segment of a code of the external memory may be required to be loaded and run based on a requirement of the program startup. However, since the code segments which have been run are stored in an internal storage space, that is, the idle storage space of the RAM, the internal storage space has no remaining space to store the codes required to be run currently for the program startup. Therefore, a part of code segments of the RAM which have been run are required to be deleted from the RAM, such that the space may be freed to store codes required to be run subsequently. Specifically, a manner of deleting the at least the part of the code segments which have been run may include deleting a segment of the code once the segment of the code has been run, or deleting a part of codes required to be deleted simultaneously after all of the code segments loaded to the RAM in this time have been run, or covering the part of the code segments which have been run with new code segments to realize a purpose of deleting the part of code segments which have been run, and the like. Therefore, the manners of deleting the at least the part of code segments which have been run will not be specifically limited.

According to the above solution, in a case of the internal storage space being insufficient, after the part of code segments which have been run are deleted, the part of the startup codes stored in the external memory in segments are further loaded to the RAM and executed, so as to support a normal startup of the larger program. In this way, codes required for the startup of the larger program are not required to all be loaded to the RAM at one time, such that the RAM having a relative small size may able to support the normal startup of the larger program without adding the number of internal memories or adopting other ways to enlarge a capacity.

The RAM may include a code resident area, a first data area, a second data area, and a code updating area. The external memory may include a generic code area, a third data area, and a non-generic code area. The code resident area may store codes configured for addressing and loading the external memory, decoding codes configured to decrypt encrypted code segments, codes configured for addressing and loading data of the external memory, and an interrupting process program. The second data area may be configured to store a segment address mapping table and decoding codes configured to decrypt encrypted data. The first data area may be configured to load data of the third data area of the external memory, such that the size of the RAM may be not required to be increased in response to larger data being required to be used in a program startup process. The code updating area may be configured to store codes loaded from the external memory.

In some embodiments, the generic code area of the external memory may be configured to store codes run in the code resident area of the RAM, and capable of storing encrypted codes and non-encrypted codes. The third data area may be configured to load data in the first data area of the RAM. The non-generic mode area may be configured to store non-generic codes required for the program startup.

Figure 2:
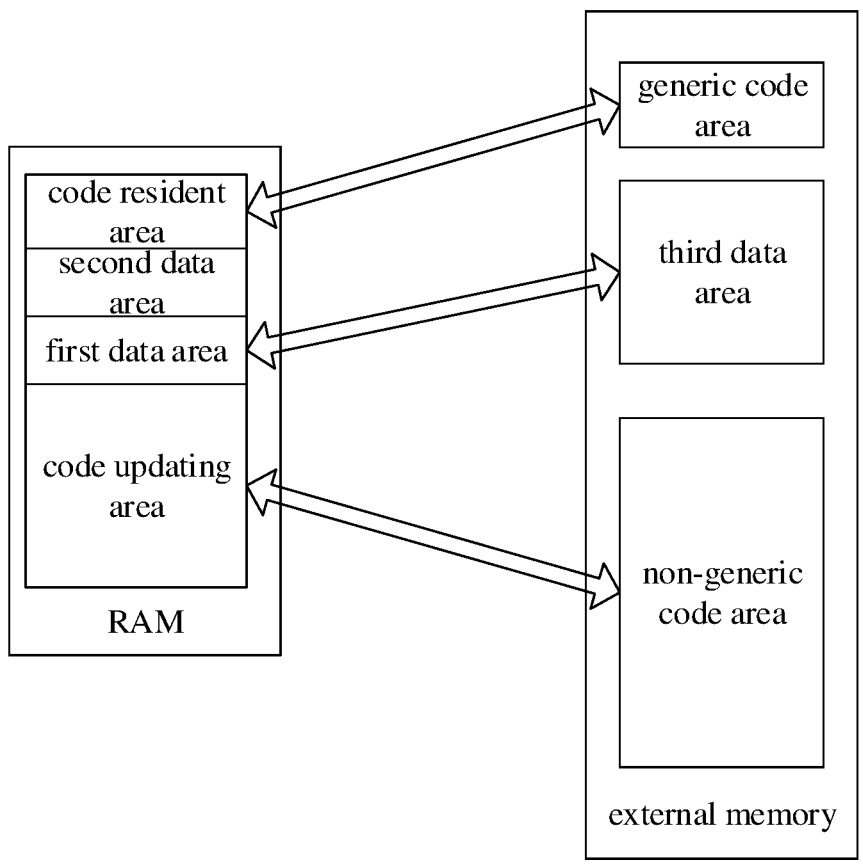
FIG. 2 is a schematic view of a communication between a RAM and an external memory according to an embodiment of the program startup method of the present disclosure.

In order to more clearly describe a communication between the RAM and the external memory disclosed in some embodiments of the present disclosure, please refer to FIG. 2. FIG. 2 is a schematic view of a communication between a RAM and an external memory according to an embodiment of the program startup method of the present disclosure.

As shown in FIG. 2, the RAM may be a SRAM. The code resident area of the RAM corresponds to the generic code area of the external memory, the first data area corresponds to the third data area, and the code updating area corresponds to the non-generic code area. Specifically, codes of the generic code area may be loaded to the code resident area, and the first data area of the RAM may be configured to load data of the third data area of the external memory. Codes of the non-generic code area may be loaded to the code updating area.

In some disclosed embodiments, the startup codes include the generic codes and the non-generic codes, and the generic codes are required to be run each time the program is started. The generic codes are stored in the generic code area of the external memory or the code resident area of the RAM. The non-generic codes are segmented and stored in the non-generic code area of the external memory. A storing size of each segment of the non-generic codes is less than or equal to a size of the code updating area of the RAM. The generic codes may be system-starting codes, the encrypted/decrypted codes, interrupting process program codes, and the like. The system-starting codes may be configured to realize effects such as a system initialization. The encrypted codes may be configured to perform an encrypting process for the codes. The decrypted codes may be configured to perform a decrypting process for the encrypted codes. The interrupting process program codes may be described in the following.

In some embodiments, a specific manner of the operation of loading one of the code segments of the external memory to a RAM and running the one of the code segments multiple times, may be the following.

In a first operation, the generic codes of the external memory are loaded to the code resident area in the RAM and at least a part of the generic codes are run. A manner of the generic codes of the external memory being loaded to the RAM may be configured to start from an initial BootROM. The BootROM is configured to transfer the generic codes of the generic code area of the external memory to the code resident area of the RAM. A transferring operation herein may be a copy operation, that is, the generic codes of the generic code area of the external memory is copied to the code resident area of the RAM. When the generic codes are encrypted, the BootROM is configured to decrypt the generic codes first and then transfer the generic codes. The BootROM is generally may be configured as a bootloader. By the generic codes being loaded to the code resident area of the RAM, and the non-generic codes being loaded to the code updating area of the RAM, that is, the generic codes and the non-generic codes being stored separately, a possibility of confusing the generic codes and the non-generic codes may be reduced.

In some embodiments, an operation of running the at least the part of the generic codes may include at least one of the following operations. First, a system initialization process is performed. Then, an address mapping table is established, and the address mapping table is stored in a second data area of the RAM. The address mapping table is configured to store storage addresses of the non-generic codes in the code updating area, and/or storage addresses of data required for the program startup in the first data area of the RAM. Specifically, the address mapping table may be one and may also be two. When the address mapping table is one, the address mapping table may be configured to store the storage addresses of the non-generic codes in the code updating area and the storage addresses of the data required for the program startup in the first data area of the RAM. In some embodiments, the address mapping table may further include addresses of non-generic code segments or an address of data in the external memory. Specifically, the address mapping table is configured to store a mapping between the storage addresses of the non-generic codes in the code updating area and storage addresses of the non-generic codes in the non-generic code area of the external memory, and/or a mapping between the storage addresses of data required for the program startup in the first data area of the RAM and storage addresses of the data required for the program startup in the third data area of the external memory. That is, the code segments may be stored in the RAM and the external memory simultaneously. The address mapping table may be configured to store a mapping relationship between addresses of the code segments in the RAM and addresses of the code segments in the external memory. When address mapping tables include a code address mapping table and a data address mapping table respectively, the code address mapping table may be configured to store the addresses of the non-generic codes in the code updating area, and the data address mapping table may be configured to store the storage addresses of the data required for the program startup in the first data area of the RAM. As mentioned above, an operation of loading the non-generic code segments to the RAM may be the copy operation, that is, one of the non-generic code segments may be stored in the RAM and the external memory simultaneously, in this case, the address mapping table may simultaneously store the addresses of the non-generic code segments in the RAM and the addresses of the non-generic code segments in the external memory. Of course, the data address mapping table may include the address of data in the external memory. In some embodiments, when storage positions of the non-generic codes or storage positions of the data are changed, a corresponding address mapping table may be updated. That is, the non-generic code address mapping table is updated when the storage positions of the non-generic codes are changed, and the data address mapping table is updated when the storage positions of the data are changed. In this way, the address mapping table may be able to store the newest storage address information of the non-generic codes or the data. In some disclosed embodiments, before the non-generic codes are loaded or the data are loaded, the corresponding address mapping table is updated. For example, before the non-generic codes are loaded to the RAM, the code address mapping table is updated first, or before the data is loaded to the RAM, the data address mapping table is updated first. After the corresponding address mapping table is updated, corresponding non-generic codes or data are then loaded to the RAM.

In a second operation, after the at least the part of the generic codes has been run, an operation of loading at least one segment of the non-generic codes of the external memory to the code updating area of the RAM and running the non-generic codes of the code updating area is performed at least one time. For example, after the system initialization process is performed and the address mapping table is established, a transferring program may be configured to load a first segment code of the non-generic code area of the external memory to the code updating area and run the first segment code of the RAM. Before codes read by the external memory are loaded to the RAM, when the codes are detected to be in an encrypted state, corresponding decrypting codes may be run to decrypt the codes in the encrypted state. Specifically, the decrypting codes configured to decrypt the codes are the generic codes. A program in the encrypted state may be started normally by means of the decrypting codes, such that a successful rate of the program startup may be improved relative to a case of having no decrypting codes.

In a process of storing the startup codes of the program in the external memory, the non-generic codes of the startup codes are segmented to multiple segments, for example, the non-generic codes of the startup codes are segmented to X segments. The multiple segments of the non-generic codes are stored in the non-generic code area of the external memory in sequence. A segmentation manner of the non-generic codes of the startup codes may be determined based on sizes of the startup codes. The sizes of the startup codes are referring to sizes of storage spaces occupied by the startup codes. For example, when the non-generic codes are relatively large, the segmentation number may be relatively large. When the non-generic codes are relatively small, the segmentation number may be relatively small.

Specifically, a segmentation process is also performed for the non-generic code area of the external memory, that is, the non-generic code area is divided into a first non-generic code area, a second non-generic code area, . . . , an N non-generic code area. The segmentation number (X) of the non-generic codes of the startup codes is less than or equal to a segmentation number (N) of the non-generic code area of the external memory. Of course, a size of each segment of the non-generic code area of the external memory is greater than or equal to each segment of the startup codes. In some embodiments, a size of each non-generic code segment divided by the non-generic code area of the external memory is less than or equal to a size of the code updating area of the RAM.

In a process of running the non-generic codes of the code updating area, in response to the non-generic codes running abnormally, a first interrupting process program in the code resident area may be run to execute loading to-be-run non-generic codes in the external memory to the code updating area and running the non-generic codes in the code updating area in response to detecting the to-be-run non-generic codes are not stored in the code updating area. Specifically, the to-be-run non-generic codes may be instructed based on a positioning instruction. In some embodiments, the positioning instruction may be configured to instruct the to-be-run non-generic code through carrying an identifier of the to-be-run non-generic code. The identifier of the to-be-run non-generic code may be an address of a non-generic code, and may also be a segmentation identifier of the non-generic code. Specifically, in a case of a non-generic code identifier being the segmentation identifier, the non-generic codes may be divided into X segments, and the non-generic code identifier may be a segment number at which the non-generic code is located. For example, a position in which the to-be-run non-generic code is located is at a third segment, and the non-generic code identifier is 3. Of course, the identifier of the to-be-run code segment may be an identifier of multiple segments of the non-generic codes, for example, 3-4. Of course, the non-generic code identifier is only as an example, in other embodiments, all manners capable of representing the non-generic codes may be used, which will not be specifically limited in some embodiments of the present disclosure. Specific cases of running abnormally include a case that a corresponding non-generic code unable to be found in the RAM based on the identifier of the to-be-run non-generic code carried by the positioning instruction, resulting in running abnormally. For example, when a maximum address of the non-generic codes in a current code updating area stored in a target address mapping table is 16, and an address of the non-generic code carried by the positioning instruction is 17, the running abnormally may occur.

The first interrupting process program may be configured to determine whether the non-generic code identifier carried by the positioning instruction exceeds the non-generic code identifier of the code updating area, which may be executed in a specific way that the first interrupting process program may determine whether the address of the non-generic code carried by the positioning instruction is greater than the maximum address of the non-generic code in the current code updating area stored in the address mapping table. When a determination result is that the address of the non-generic code carried by the positioning instruction is greater than the maximum address of the non-generic codes in the current code updating area stored in the address mapping table, the to-be-run non-generic code indicated by the positioning instruction is determined to be not stored in the code updating area. In other disclosed embodiments, the first interrupting process program is configured to determine whether the non-generic code identifier carried by the positioning instruction is greater than a maximum segmentation identifier of the non-generic code in the current code updating area stored in the address mapping table. When a determination result is that the segmentation identifier of the non-generic code carried by the positioning instruction is greater than the maximum segmentation identifier of the non-generic code, the to-be-run non-generic code indicated by the positioning instruction is determined to be not stored in the code updating area. Subsequently, the transferring program may be run to load a to-be-run code of the external memory to the code updating area of the RAM. Before loading, whether the to-be-run code is encrypted may also be determined first. When the to-be-run code is encrypted, the to-be-run code is decrypted first by means of the generic codes, and then transferred by the transferring program. The address mapping table is updated before the transferring program loads the to-be-run code of the external memory to the code updating area of the RAM.

In some embodiments, deleting at least a part of the codes which have been run may be performed by deleting the non-generic codes of the code updating area which have been run. A specific deletion manner may be deleting a segment of the non-generic codes after the segment of the non-generic codes has been run, or deleting the non-generic codes simultaneously after all of the non-generic codes of the code updating area have been run, or covering directly the non-generic codes which have been run with other non-generic codes loaded subsequently to achieve a purpose of deleting the codes which have been run. The generic codes and the non-generic codes are stored in two areas of the RAM respectively, the non-generic codes which have been run are deleted while the generic codes are retained, such that the space may be idled to accommodate non-generic codes which have not been run. In this way, the normal startup of the larger program may also be ensured while the larger program is started by means of the RAM having a relatively small size.

In some disclosed embodiments, to-be-accessed data required in a process of running the non-generic codes is stored in the first data area of the RAM. The to-be-accessed data may be a global variable, a local variable such as a function, and the like. Any data required for the program startup may become the to-be-accessed data in some embodiments of the present disclosure.

In some embodiments, in response to abnormal data occurring, a second interrupting process program in the code resident area may be run, such that loading the to-be-accessed data of the third data area of the external memory to the first data area may be executed in response to detecting the to-be-accessed data is not stored in the first data area of the RAM. The abnormal data includes corresponding to-be-accessed data unable to be found in the RAM. A specific manner that the interrupting process program detects the to-be-accessed data is not stored in the first data area of the RAM may be determining whether an address of the to-be-accessed data in the RAM is stored in the address mapping table. When the address of the to-be-accessed data in the RAM is not stored in the address mapping table, it is determined that the to-be-accessed data is not stored in the first data area of the RAM. Then, the transferring program may be run, the corresponding to-be-accessed data of the external memory is loaded to the first data area. In some embodiments, the transferring program for loading the to-be-accessed data may be the same as the transferring program for loading the generic codes or the non-generic codes, or may be different from the transferring program for loading the generic codes or the non-generic codes. Of course, before the to-be-accessed data is loaded to the first data area, whether the to-be-accessed data is in the encrypted state is determined. In response to the to-be-accessed data being in the encrypted state, the decrypting codes of the second data area may be run to decrypt the to-be-accessed data. After the to-be-accessed data is loaded to the first data area of the RAM, the non-generic codes of the code updating area continue to be run to access to the to-be-accessed data. A part of the data is stored in the external memory, loaded to the RAM when required by the program startup, and not required to be stored in the first data area all the time, such that an enough available space may be ensured in the first data area to accommodate the data required for the program startup when the larger program is started, and the normal startup of the program may be further ensured.

In some disclosed embodiments, the data required for the program startup is at least partially stored in the external memory, and the part of the data stored in the external memory includes a plurality of data segments. A size of each data segment is less than or equal to a size of an area of the RAM capable of accessing each data segment. A specific segmentation manner may refer to a segmentation of the code segments, and a segmentation of the data segments will not be repeated.

In some embodiments, after the startup requirement for the program is detected, an operation of loading one of the data segments of the external memory to the RAM and accessing the one of the data segments may be performed multiple times. The one of the data segments loaded each time is different with each other. The operation of loading the one of the data segments of the external memory to the RAM being performed multiple times may refer to an operation of loading the one of the code segments of the external memory to the RAM being performed multiple times, which will not be repeated.

In some disclosed embodiments, a process of performing the operation of loading the one of the data segments of the external memory to the RAM and accessing the one of the data segments multiple times may include following operations. Whether a size of the to-be-accessed data is greater than a preset threshold is determined. In response to the size of the to-be-accessed data being less than or equal to the preset threshold, an operation of loading the to-be-accessed data to the RAM may be performed. In response to the size of the to-be-accessed data being greater than the preset threshold, at least one of the following operations may be performed.

First, other data satisfying a first preset condition, that is, to-be-removed data, may be removed from the first data area of the RAM, to load the to-be-accessed data. In some embodiments, the meaning of "removed" may include "directly" deleting the to-be-removed data from the RAM, and the manners of deleting may include covering the to-be-removed data with a to-be-accessed data segment. The to-be-accessed data is currently-required data of the data required for the program startup, and the to-be-removed data is data other than the to-be-accessed data of the data required for the program startup. The first preset condition may be that the data has been accessed and is no longer accessed in the program startup process, or is irrelevant to the program startup. A setting of the preset threshold may be determined based on an available space of the first data area of the RAM. For example, the preset threshold may be the available space of the first data area. In response to the size of the to-be-accessed data exceeding a currently-available space of the first data area, that is, a remaining space, the other data satisfying a preset condition, that is the to-be-removed data, may be moved to the third data area of the external memory. That is, the preset threshold thereof may not be fixed or unchanged, and may vary dynamically as the available space of the first data area. The preset condition may be that the data is not going to be accessed in a relatively long period or has been accessed. The relatively long period may be set based on program startup time, which will not be specifically limited.

Second, other data satisfying a second preset condition may be moved to the external memory, to load the to-be-accessed data. In some embodiments, the second preset condition may be the same as the first preset condition and may be different from the first preset condition. In the present embodiment, the second condition may be the data which has been accessed in the program startup process, or the data which is not accessed or is not going to be run in a future period. In a case that the data required for the program startup is stored in the external memory, when the other data satisfying the first preset condition is moved from the first data area of the RAM to the third data area of the external memory, the data of the external memory may be not covered, or moved data may be configured to cover the same data of the external memory as the moved data. In a case that data required to be moved is not stored in the external memory, in a process of moving the data required to be moved to the external memory, the data of the external memory may be not covered.

In some embodiments, in the process of performing the operation of loading the one of the code segments of the external memory to the RAM and running the one of the code segments multiple times, whether the to-be-loaded code segment is encrypted is detected. In response to the to-be-loaded code segment being encrypted, the corresponding decrypting codes may be configured to decrypt the to-be-loaded code segment. In the process of performing the operation of loading the one of the data segments of the external memory to the RAM and accessing the one of the data segments multiple times, whether the to-be-accessed data segment is encrypted is detected. In response to the to-be-accessed data segment being encrypted, the corresponding decrypting codes may be configured to decrypt the to-be-accessed data segment. After the decrypting process is performed, then a corresponding code segment or data segment may be loaded. Before the codes or data read by the external memory are or is loaded to the RAM, when the codes or the data are or is detected to be in the encrypted state, the corresponding decrypting codes may be run to decrypt the to-be-loaded codes or the to-be-accessed data in the encrypted state. A specific decrypting process for the codes or the data may refer to the above description, which will not be repeated. By moving the other data satisfying the first preset condition from the first data area of the RAM to the third data area of the external memory in a case that the size of the to-be-accessed data is greater than the preset threshold, the first data area of the RAM may have the enough available space to accommodate the to-be-accessed data to ensure the normal startup of the program.

The third data area of the external data is also segmented, that is, the third data area is divided into a third data area segment A, a third data area segment B . . . , a third data area segment M, and each segment may be configured to store the to-be-accessed data. Specifically, the address mapping table may be also configured to store a mapping relationship between an address of the data required for the program startup in the RAM and an address of the data required for the program startup in the external memory. In some embodiments, a size of each segment segmented by the third data area may be equal to the size of the first data area of the RAM, that is, a size of the third data area segment A is equal to a size of the third data area segment B, and is equal to the size of the first data area of the RAM. Of course, the size of each segment segmented by the third data area may also be less than the size of the first data area of the RAM.

The program described in some embodiments of the present disclosure comprises at least one of a system-startup program, a system program, and an application program. Specifically, the program is a program packaged by the system-startup program, the system program, and the application program. The program may be encrypted or not be encrypted. In case that the program is encrypted, the program may be required to decrypted when the program is started, such that a possibility of a case of being stolen may be reduced better.

According to technical solutions provided by some embodiments of the present disclosure, the size of the RAM may be only required to ensure a function of capable of storing the generic codes, the first data area, the second data area, and the code updating area. In some embodiments, the size of the code updating area may be set based on a comprehensive consideration for a function during the program being started or run. For example, in response to the size of the code updating area being over small, the codes may be loaded frequently from the external memory, such that the program startup speed may be slowed. Therefore, the size of the code updating area may be set based on actual requirements, which will not be specifically limited herein. Similarly, the size of the external memory may be chosen based on specific requirements, as long as the size of the external memory may be supported by an accessing address line.

According to the above solutions, in response to the internal storage space being insufficient, after a part of the codes of the RAM which have been run is deleted, the startup codes segmented and stored in the external memory are loaded to the RAM and executed, such that the normal startup of the larger program may be supported. In this way, the codes required for the startup of the larger program are not required to be all loaded to the RAM at one time, such that the RAM having a relatively small size may able to support the normal startup of the larger program without adding the number of internal memories or adopting other ways to enlarge a capacity.

An execution body of the program startup method may be a program startup device. For example, the program startup method may be executed by a terminal device or a server or other processing devices. The terminal device may be a User Equipment (UE), a mobile device, a user terminal, a terminal, a cellular phone, a cordless phone, a Personal Digital Assistant (PDA), a handheld device, a computing device, an in-vehicle device, a wearable device, and the like. In some possible implementations, the program startup method may be implemented by the processor calling computer-readable instructions stored in the RAM.

Figure 3:
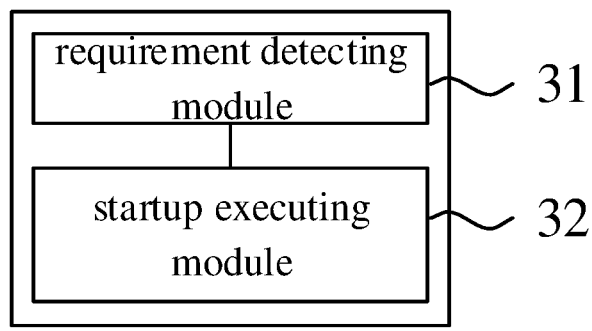
FIG. 3 is a schematic structural diagram of a program startup device according to an embodiment of the present disclosure.

FIG. 3 is a schematic structural diagram of a program startup device according to an embodiment of the present disclosure. The program startup device 30 may include a requirement detecting module 31 and a startup executing module 32. The requirement detecting module 31 may be configured to detect a startup requirement for a program. Startup codes of the program are at least partially stored in an external memory, and a part of the startup codes stored in the external memory includes a plurality of code segments. The startup executing module 32 is configured to perform an operation of loading one of the code segments of the external memory to a RAM and running the one of the code segments multiple times. The one of the code segments loaded each time is different with each other. A size of each code segment is less than or equal to a size of an area of the RAM capable of executing each code segment.

According to the above solutions, by loading the startup codes segmented and stored in the external memory to the RAM and executing loaded startup codes, the startup codes are not required to be all loaded to the RAM at one time, thus the program startup efficiency may be improved. For example, in a case of the program being relatively large, when the program is started, in response to all of the startup codes required for the program startup being required to be loaded at one time, the startup speed may thus be slow, that is, the program response speed may be slow.

Figure 4:
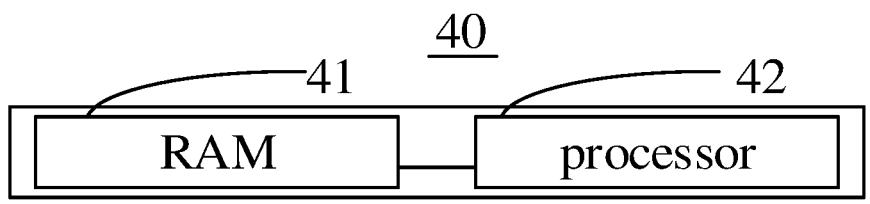
FIG. 4 is a schematic structural diagram of an electronic device according to an embodiment of the present disclosure.

FIG. 4 is a schematic structural diagram of an electronic device according to an embodiment of the present disclosure. The electronic device 40 may include a RAM 41 and a processor 42. The processor 42 may be configured to execute program instructions stored in the RAM 41, so as to implement operations of any embodiment of the program startup method mentioned above. In a specific implementation scenario, the electronic device 40 may include, but be not limited to, a microcomputer, a desktop computer, and a server. In addition, the electronic device 40 may also include a mobile device such as a notebook computer and a tablet computer, which is not limited herein.

Specifically, the processor 42 is configured to control itself and the RAM 41 to implement the operations of any embodiment of the program startup method mentioned above. The processor 42 may also be referred to as a Central Processing Unit (CPU). The processor 42 may be an integrated circuit chip having a signal-processing capability. The processor 42 may also be a generic processor, a Digital Signal Processor (DSP), an Application Specific Integrated Circuit (ASIC), a Field-Programmable Gate Array (FPGA) or other Programmable logic devices, a discrete gate or transistor logic device, a discrete hardware assembly. The generic processor may be a microprocessor or any conventional processor or the like. In addition, the processor 42 may be jointly implemented by the integrated circuit chip.

According to the above solutions, by loading the startup codes segmented and stored in the external memory to the RAM and executing the loaded startup codes, the startup codes are not required to be all loaded to the RAM at one time, thus the program startup efficiency may be improved. For example, in a case of the program being relatively large, when the program is started, in response to all of the startup codes required for the program startup being required to be loaded at one time, the startup speed may thus be slow, that is, the program response speed may be slow.

Figure 5:
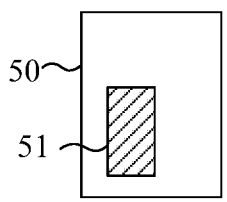
FIG. 5 is schematic structural diagram of a non-transitory computer-readable storage medium according to an embodiment of the present disclosure.

FIG. 5 is schematic structural diagram of a non-transitory computer-readable storage medium according to an embodiment of the present disclosure. The non-transitory computer-readable storage medium 50 is configured to store program instructions 51 capable of being executed by a processor, and the program instructions 51 are configured to implement the operations of any embodiment of the program startup method mentioned above.

According to the above solutions, by loading the startup codes segmented and stored in the external memory to the RAM and executing the loaded startup codes, the startup codes are not required to be all loaded to the RAM at one time, thus the program startup efficiency may be improved. For example, in a case of the program being relatively large, when the program is started, in response to all of the startup codes required for the program startup being required to be loaded at one time, the startup speed may thus be slow, that is, the program response speed may be slow.

In some embodiments, functions or modules included in the devices provided in some embodiments of the present disclosure may be configured to execute the method described in the above method embodiments. For a specific implementation, may refer to a description of the above method embodiments, for brevity, which will not be repeated herein.

A description for each embodiment in the above tends to emphasize a difference between each embodiment. The same or a similarity between each embodiment may be referred to each other, for brevity, which will not be repeated herein.

In some embodiments of the present disclosure, it should be understood that the method or device may be implemented by other means. For example, device implementations described above are only illustrative. For example, a division of modules or units is only a logical function division. In actual implementation, there may be other division manners. For example, units or components may be combined or integrated to another system. Or some features may be ignored, or not implemented. On the other hand, a mutual coupling or a direct coupling or communication connection shown or discussed may be achieved by means of some interfaces. The indirect coupling or the communication connection of devices or units may be in an electrical form, a mechanical form or other forms.

In addition, each functional unit in each embodiment of the present disclosure may be integrated into one processing unit, or each unit may exist physically alone, or two or more units may be integrated into one unit. Above-mentioned integrated unit may be implemented in a form of a hardware or may be implemented in a form of a software functional unit. When the integrated unit is implemented in the form of the software functional unit and sold or used as an independent product, the integrated unit may be stored in a non-transitory computer-readable storage medium. Based on the above understanding, technical solutions of the present disclosure in essence or a part of the technical solutions contributing to the related art, or all or a part of the technical solutions may be embodied in the form of a software product. The software product of a computer is stored in a non-transitory storage medium including some instructions to allow a computer device (may be a personal computer, the server, or a network device, etc.) or a processor to execute all or a part of the operations of the method according to various embodiments of the present disclosure. The aforementioned non-transitory storage medium includes a U disk, a mobile hard disk, a Read-Only Memory (ROM), a Random Access Memory (RAM), a magnetic disk or an optical disk and various media capable of storing program codes.

What is claimed is:

1. A program startup method, comprising:
   detecting a startup requirement for a program, wherein startup codes of the program are at least partially stored in an external memory, and a part of the startup codes stored in the external memory comprises a plurality of code segments; and
   performing an operation of loading one of the code segments of the external memory to a RAM and running the one of the code segments multiple times, wherein the one of the code segments loaded each time is different with each other;

wherein a size of each code segment is less than or equal to a size of an area of the RAM capable of executing the each code segment;

wherein the startup codes comprise generic codes and non-generic codes, and the generic codes are required to be run each time the program is started;

wherein the generic codes are stored in a generic code area of the external memory or a code resident area of the RAM, and the non-generic codes are segmented and stored in a non-generic code area of the external memory;

wherein the performing an operation of loading one of the code segments of the external memory to a RAM and running the one of the code segments multiple times comprises:

performing an operation of loading at least one segment of the non-generic codes of the external memory to a code updating area of the RAM and running the non-generic codes of the code updating area at least one time:

wherein the operation of loading at least one segment of the non-generic codes of the external memory to a code updating area of the RAM and running the non-generic codes of the code updating area, comprising at least one of:

in response to the non-generic codes running abnormally, running a first interrupting process program in the code resident area, to execute loading to-be-run non-generic codes in the external memory to the code updating area and running the non-generic codes in the code updating area in response to detecting the to-be-run non-generic codes are not stored in the code updating area.

2. The method according to claim 1, further comprising:
running the generic codes, wherein the running the generic codes comprises:
performing a system initialization process; and
establishing an address mapping table, and storing the address mapping table in a second data area of the RAM, wherein the address mapping table is configured to store a mapping between storage addresses of the non-generic codes in the code updating area and storage addresses of the non-generic codes in the non-generic code area of the external memory, and/or a mapping between storage addresses of data required for the program startup in a first data area of the RAM and storage addresses of the data required for the program startup in a third data area of the external memory.

3. The method according to claim 1, further comprising:
in response to abnormal data occurring, running a second interrupting process program in the code resident area, to execute loading to-be-accessed data of a third data area of the external memory to a first data area in response to detecting the to-be-accessed data is not stored in the first data area of the RAM; wherein the abnormal data comprises the to-be-accessed data unable to be found in the RAM.

4. The method according to claim 1, wherein the performing an operation of loading one of the code segments of the external memory to a RAM and running the one of the code segments multiple times, comprises:
determining whether an idle storage space of the RAM is less than a storage space required by a to-be-loaded code segment;

in response to the idle storage space of the RAM being less than the storage space required by the code segments to be loaded, performing at least one of following operations of:

removing at least a part of the code segments of the RAM which have been run and/or at least a part of the code segments of the RAM which are not going to be run in a preset period from the RAM, to load the to-be-loaded code segment to the RAM; and moving at least the part of the code segments of the RAM which have been run and/or at least the part of the code segments of the RAM which are not going to be run in the preset period to the external memory, to load the to-be-loaded code segment to the RAM.

5. The method according to claim 1, wherein data required for the program startup is at least partially stored in the external memory, wherein a part of the data stored in the external memory comprises a plurality of data segments, the method further comprises:

performing an operation of loading one of the data segments of the external memory to the RAM and accessing the one of the data segments multiple times, wherein the one of the data segments loaded each time is different with each other;

wherein a size of each data segment is less than or equal to a size of an area of the RAM capable of accessing the each data segment.

6. The method according to claim 5, wherein the performing an operation of loading one of the data segments of the external memory to the RAM and accessing the one of the data segments multiple times, comprises:
determining whether a size of the to-be-accessed data is greater than a preset threshold; and
in response to the size of the to-be-accessed data being less than or equal to the preset threshold, loading the to-be-accessed data to the RAM.

7. The method according to claim 5, wherein the performing an operation of loading one of the data segments of the external memory to the RAM and accessing the one of the data segments multiple times, comprises:
in response to a size of to-be-accessed data being greater than a preset threshold, performing at least one of:
removing other data satisfying a first preset condition from a first data area of the RAM, to load the to-be-accessed data; and
moving other data satisfying a second preset condition to the external memory, to load the to-be-accessed data;
wherein the to-be-accessed data is currently-required data of the data required for the program startup, and the other data is data other than the to-be-accessed data of the data required for the program startup.

8. The method according to claim 5, wherein the performing an operation of loading one of the data segments of the external memory to the RAM and accessing the one of the data segments multiple times, comprises:
detecting whether a to-be-accessed data segment is encrypted; and
in response to the to-be-accessed data segment being encrypted, performing a decrypting process for the to-be-accessed data segment with corresponding decrypting codes.

9. The method according to claim 1, wherein the performing an operation of loading one of the code segments of the external memory to a RAM and running the one of the code segments multiple times, comprises:
detecting whether a to-be-loaded code segment is encrypted; and in response to the to-be-loaded code segment, performing a decrypting process for the to-be-loaded code segment with corresponding decrypting codes.

10. An electronic system, comprising:
an external memory, comprising:
a generic code area;
a third data area; and
a non-generic code area; and
an electronic device, comprising:
a RAM, comprising:
a code resident area;
a first data area;
a second data area; and
a code updating area; and
a processor;
wherein the processor is configured to execute program instructions stored in the RAM, wherein when the program instructions are executed by the processor, the processor is caused to perform:
detecting a startup requirement for a program, wherein startup codes of the program are at least partially stored in the external memory, and a part of the startup codes stored in the external memory comprises a plurality of code segments; and
performing an operation of loading one of the code segments of the external memory to the RAM and running the one of the code segments multiple times, wherein the one of the code segments loaded each time is different with each other;
wherein a size of each code segment is less than or equal to a size of an area of the RAM capable of executing the each code segment;
wherein the startup codes comprise generic codes and non-generic codes, and the generic codes are required to be run each time the program is started;
wherein the generic codes are stored in a generic code area of the external memory or a code resident area of the RAM, and the non-generic codes are segmented and stored in a non-generic code area of the external memory;
wherein in the performing an operation of loading one of the code segments of the external memory to a RAM and running the one of the code segments multiple times, the processor is caused to perform:
performing an operation of loading at least one segment of the non-generic codes of the external memory to a code updating area of the RAM and running the non-generic codes of the code updating area at least one time;
wherein in the performing an operation of loading at least one segment of the non-generic codes of the external memory to a code updating area of the RAM and running the non-generic codes of the code updating area, the processor is caused to perform:
in response to the non-generic codes running abnormally, running a first interrupting process program in the code resident area, to execute loading to-be-run non-generic codes in the external memory to the code updating area and running the non-generic codes in the code updating area in response to detecting the to-be-run non-generic codes are not stored in the code updating area.

11. The electronic system according to claim 10, the processor is further caused to perform running the generic codes, wherein in the running the generic codes, the processor is caused to perform:
performing a system initialization process; and
establishing an address mapping table, and storing the address mapping table in a second data area of the RAM, wherein the address mapping table is configured to store a mapping between storage addresses of the non-generic codes in the code updating area and storage addresses of the non-generic codes in the non-generic code area of the external memory, and/or a mapping between storage addresses of data required for the program startup in the first data area of the RAM and storage addresses of the data required for the program startup in a third data area of the external memory.

12. The electronic system according to claim 10, wherein the processor is caused to perform:
in response to abnormal data occurring, running a second interrupting process program in the code resident area, to execute loading to-be-accessed data of a third data area of the external memory to the first data area in response to detecting the to-be-accessed data is not stored in the first data area of the RAM; wherein the abnormal data comprises the to-be-accessed data unable to be found in the RAM.

13. The electronic system according to claim 10, wherein in the performing an operation of loading one of the code segments of the external memory to a RAM and running the one of the code segments multiple times, the processor is caused to perform:
determining whether an idle storage space of the RAM is less than a storage space required by a to-be-loaded code segment;
in response to the storage space of the RAM being less than the storage space required by the code segments to be loaded, performing at least one of following operations of:
removing at least a part of the code segments of the RAM which have been run and/or at least a part of the code segments of the RAM which are not going to be run in a preset period from the RAM, to load the to-be-loaded code segment to the RAM; and
moving at least the part of the code segments of the RAM which have been run and/or at least the part of the code segments of the RAM which are not going to be run in the preset period to the external memory, to load the to-be-loaded code segment to the RAM.

14. The electronic system according to claim 10, wherein data required for the program startup is at least partially stored in the external memory, wherein a part of the data stored in the external memory comprises a plurality of data segments, the processor is further caused to perform:
performing an operation of loading one of the data segments of the external memory to the RAM and accessing the one of the data segments multiple times, wherein the one of the data segments loaded each time is different with each other;
wherein a size of each data segment is less than or equal to a size of an area of the RAM capable of accessing the each data segment.

15. The electronic system according to claim 14, wherein in the performing an operation of loading one of the data segments of the external memory to the RAM and accessing the one of the data segments multiple times, the processor is further caused to perform:
in response to a size of to-be-accessed data being greater than a preset threshold, performing at least one of:
removing other data satisfying a first preset condition from the first data area of the RAM, to load the to-be-accessed data; and moving other data satisfying a second preset condition to the external memory, to load the to-be-accessed data;

wherein the to-be-accessed data is currently-required data of the data required for the program startup, and the other data is data other than the to-be-accessed data of the data required for the program startup.

16. A non-transitory computer-readable storage medium, configured to store program instructions, wherein when the program instructions are executed by a processor, the processor is caused to perform:

detecting a startup requirement for a program, wherein at least a part of a startup code of the program is stored in an external memory, and the startup code comprises a plurality of code segments; and performing multiple times an operation of loading the code segments in the external memory to a RAM and running the code segments, wherein the code segments loaded each time are different;

wherein a size of each code segment is less than or equal to a size of an area in the RAM capable of executing the code segment;

wherein the startup codes comprise generic codes and non-generic codes, and the generic codes are required to be run each time the program is started;

wherein the generic codes are stored in a generic code area of the external memory or a code resident area of the RAM, and the non-generic codes are segmented and stored in a non-generic code area of the external memory;

wherein in the performing an operation of loading one of the code segments of the external memory to a RAM and running the one of the code segments multiple times, the processor is caused to perform:

performing an operation of loading at least one segment of the non-generic codes of the external memory to a code updating area of the RAM and running the non-generic codes of the code updating area at least one time;

wherein in the performing an operation of loading at least one segment of the non-generic codes of the external memory to a code updating area of the RAM and running the non-generic codes of the code updating area, the processor is caused to perform:

in response to the non-generic codes running abnormally, running a first interrupting process program in the code resident area, to execute loading to-be-run non-generic codes in the external memory to the code updating area and running the non-generic codes in the code updating area in response to detecting the to-be-run non-generic codes are not stored in the code updating area.

* * * * *